(No Model.) 2 Sheets—Sheet 1.
C. D. ARMSTRONG.
SUGAR CANE TRANSFERRING DEVICE.
No. 520,720. Patented May 29, 1894.
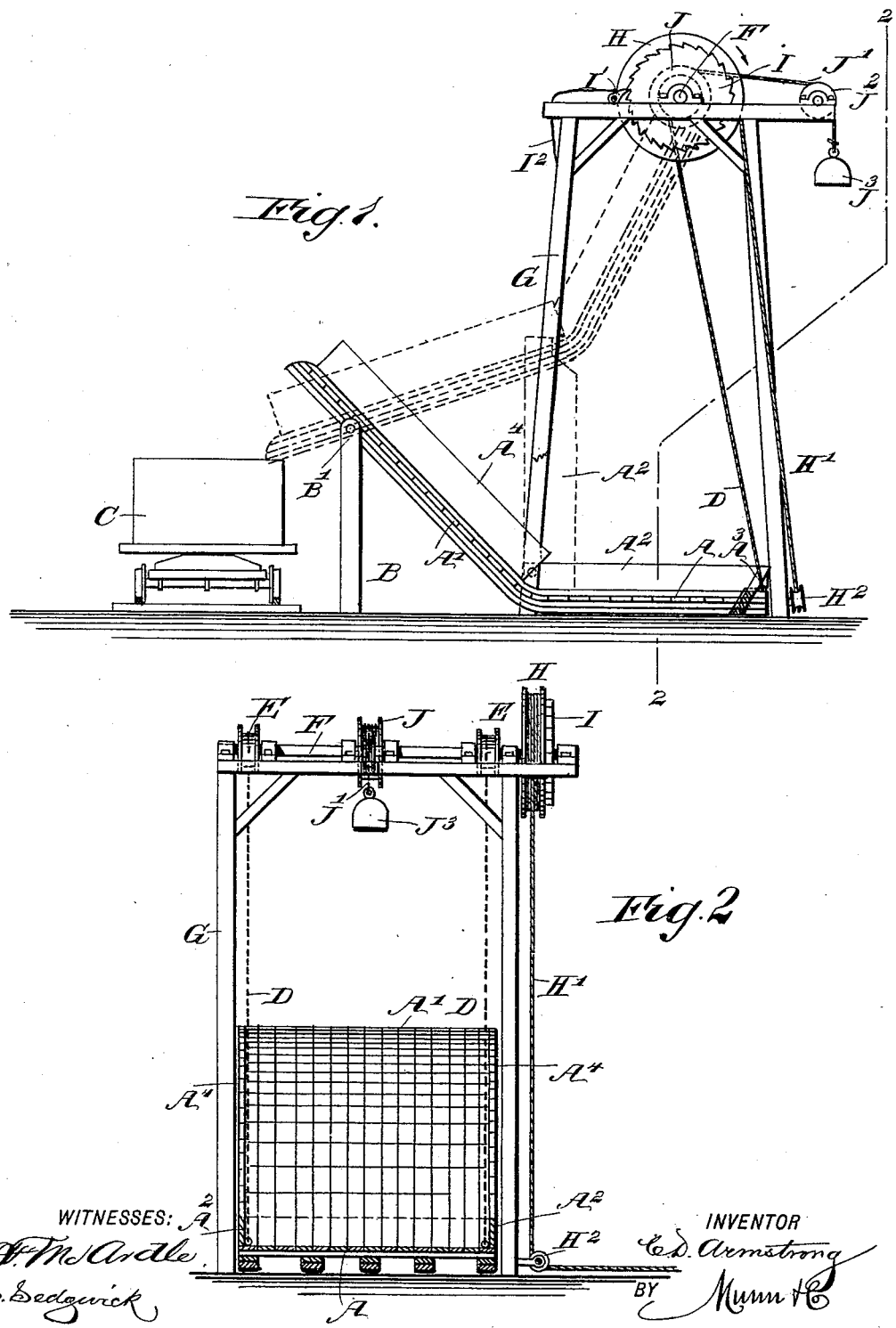

(No Model.) 2 Sheets—Sheet 2.
C. D. ARMSTRONG.
SUGAR CANE TRANSFERRING DEVICE.
No. 520,720. Patented May 29, 1894.
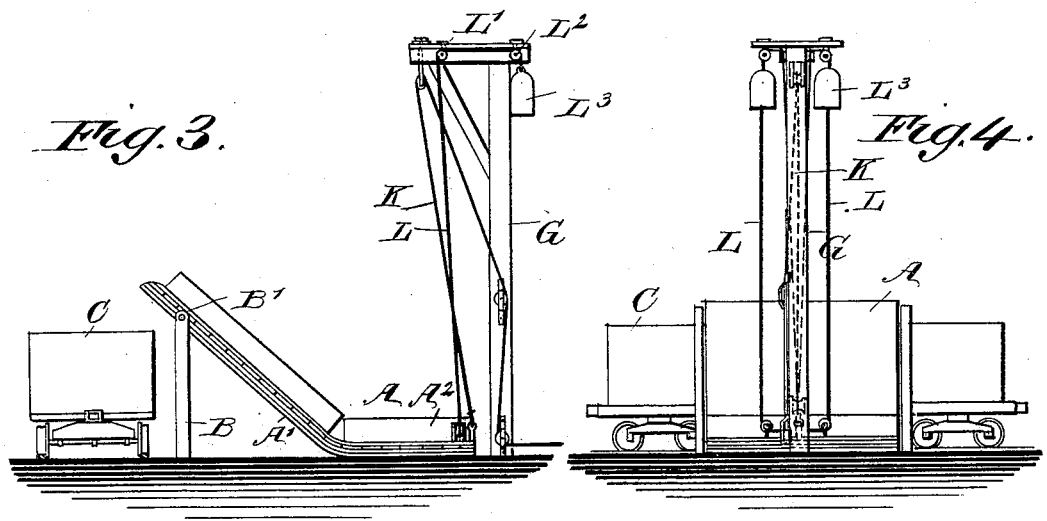
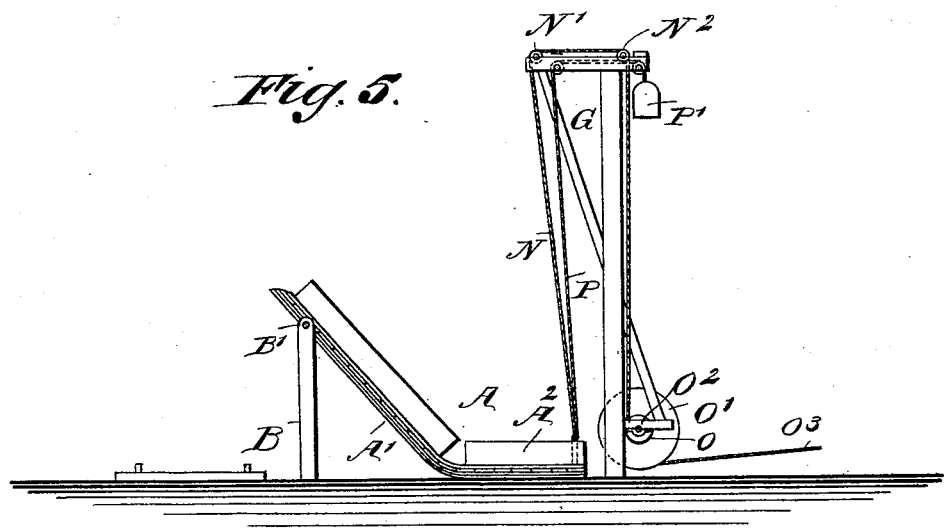
WITNESSES:
INVENTOR
C. D. Armstrong
BY
ATTORNEYS.

UNITED STATES PATENT OFFICE.

CHRISTIAN D. ARMSTRONG, OF ST. BERNARD, LOUISIANA.

SUGAR-CANE-TRANSFERRING DEVICE.

SPECIFICATION forming part of Letters Patent No. 520,720, dated May 29, 1894.

Application filed December 20, 1893. Serial No. 494,141. (No model.)

*To all whom it may concern:*

Be it known that I, CHRISTIAN DANIEL ARMSTRONG, of St. Bernard, in the parish of St. Bernard and State of Louisiana, have invented a new and Improved Sugar-Cane-Transferring Device, of which the following is a full, clear, and exact description.

The object of the invention is to provide a new and improved transferring device, which is simple and durable in construction, very effective in operation, and more especially designed to conveniently and readily transfer sugar cane from the field wagons onto the cars running to the mill.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a side elevation of the improvement with part in section. Fig. 2 is a transverse section of the same on the line 2—2 of Fig. 1. Fig. 3 is a side elevation of a modified form of the improvement. Fig. 4 is a rear view of the same; and Fig. 5 is a side elevation of another modified form of the improvement.

The improved sugar cane transferring device is provided with a platform A, adapted to normally rest on the ground, so that field wagons can drive onto the platform to dump the sugar cane thereon. On one side of the platform A is formed an angular extension A', pivotally connected at B' to a post B, erected on the ground, the said extension forming a delivery chute for the platform A when the latter is swung upward into the position shown in dotted lines in Fig. 1, to cause the cane to pass from the platform down the extension A' into the car C, adapted to carry the cane to the mill.

The platform A is provided at its ends with hinged gates A², adapted to be thrown up to permit the field wagon to pass conveniently on the platform and to drive off therefrom after dumping its load, one gate being lowered after the wagon has been driven on the platform, and the other gate is lowered after the wagon has driven off the platform and dumped its contents. The platform A is also provided on its outer side with a fixed flange A³, to hold the dumped cane on the platform, and the angular extension A' is also provided on its sides with flanges A⁴, to properly guide the cane down the extension into the car C. The free or outer end of the platform A is connected by ropes or cables D, with drums E secured on a transversely-extending shaft F, journaled in suitable bearings erected on a framework G, set on the ground over the platform A, as plainly illustrated in the drawings.

On one end of the shaft F is secured a hoisting drum H, on which winds a rope or cable H', extending downward and passing under a pulley H², supported on one of the beams of the frame G. The end of the rope or cable H' extending from the pulley H² is connected with a draft beam to which an animal is attached for exerting a pull on the said cable or rope H', to rotate the drum H and revolve the shaft F, and to wind up the ropes or cables D on the drums to impart an upward swinging motion to the platform A, to cause the contents thereof to slide down the extension A' into the car C as above described.

On the shaft F and next to the drum H is arranged a ratchet wheel I, adapted to be engaged by a pawl I', pivoted on the frame G and connected with a cord I², under the control of the operator, the said pawl I' and ratchet I serving to lock the shaft F in place after the platform A has been swung into an uppermost position by the team pulling on the rope H', as above described. After the cane is discharged from the platform and its extension A', the operator pulls the cord I² to disengage the pawl I' from the ratchet wheel I to permit the ropes or cables D to unwind from the drums E so as to permit the platform A to swing downward back to its normal position. It is understood that during this operation, the animal or team attached to the rope H' is backed up, to permit the weight of the platform A to exert a pull by its cables D on the drums E to rotate the latter and the shaft F, so that the hoisting cable H' is wound up on its drum H. In order to somewhat counterbalance the platform A, I provide a drum J secured on the shaft F and on which winds the rope J', extending to one side and over the pulley J², journaled in the upper part of the frame G.

On the end of the rope J' extending downward from the pulley J² is held a weight J³, which moves downward when the platform A swings upward, and moves upward when the platform A swings downward. It is understood that the rope J' unwinds from its drum J at the time the cables or ropes D are wound up on their drums E, and when the latter unwind, the rope J' is wound up on its drum J.

Instead of the above described hoisting mechanism illustrated in Figs. 1 and 2, I may employ a block and tackle K connected with the platform A at the outer or free end thereof, as shown in Figs. 3 and 4, the block and tackle being supported from the frame G and the free end of the rope connected with a team, the same as the rope H' above described and for the same purpose. The counterbalancing ropes L are in this case directly connected with the outer free end of the platform A, and each rope L extends upward, passes over pulleys L' and L², and supports at its downward hanging end a weight L³. As shown in Fig. 5, the platform can be raised or lowered by a rope N, connected with the free end of the platform A, and passing over pulleys N', N², to finally wind on a small pulley O by means of a large drum O' on a shaft O², upon which drum is a cable O³ and the cable is drawn from the drum by means of a team, and wound up by the descent of the platform to its normal position, in the meantime, as the team is detached. The counterbalancing rope P with its weight P', is the same as that above described in reference to Figs. 3 and 4. It will be seen that by this arrangement the sugar cane can be conveniently dumped from the field wagons on the platform, and readily transferred from the latter into the cars adapted to carry the cane to the mill, to be further treated in the usual manner.

Having thus fully described my invention, I claim as new and desire to secure by Letters Patent—

1. In a transferring device, the combination of a platform having an upwardly and outwardly inclined and flanged extension on one side, said extension being pivoted to a fixed support, and a hoisting device connected with the side of the platform opposite the inclined extension, substantially as described.

2. In a transferring device, the combination of a platform having an upwardly and outwardly inclined and flanged extension on one side, said extension being hinged to a fixed support near its outer end, gates hinged to the ends of the platform, and a hoisting device connected with the side of the platform opposite the inclined extension, substantially as described.

3. In a transferring device, the combination of a platform having an upwardly and outwardly inclined and flanged extension, said extension being hinged to a fixed support, gates hinged to the ends of the platform, a hoisting apparatus connected with the side of the platform opposite the inclined extension, and a counterbalance for said platform, substantially as described.

4. In a transferring device, the combination with a platform having an upwardly and outwardly inclined and flanged extension, said extension being pivoted to a post, of a shaft mounted above the platform, drums on the shaft between its ends, ropes secured to the drums and to the side of the platform opposite the inclined extension, a hoisting drum on one end of the said shaft, and a rope wound on the hoisting drum, and adapted to have one end connected with a draft beam, substantially as herein shown and described.

CHRISTIAN D. ARMSTRONG.

Witnesses:
ALBERT ESTOPINAL,
B. OJEDA.